United States Patent
Beam et al.

[15] 3,657,644
[45] Apr. 18, 1972

[54] THERMODIELECTRIC RADIOMETER UTILIZING POLYMER FILM

[72] Inventors: Benjamin H. Beam, Sunnyvale; Larry D. Russell, San Jose, both of Calif.

[73] Assignee: The United States of America as represented by the Administrator of the National Aeronautics and Space Administration

[22] Filed: Nov. 12, 1968

[21] Appl. No.: 774,733

[52] U.S. Cl. ...................324/61 R, 73/355 R, 250/83.3 H, 317/247
[51] Int. Cl. .................G01r 27/26, G01t 1/16, H01g 7/04
[58] Field of Search................324/61, 61 R, 106; 73/355, 73/362; 250/83.3, 83.6, 83.3 H, 83.3 UV; 317/247, 248; 330/69; 320/1; 313/93

[56] References Cited

UNITED STATES PATENTS

| | | | |
|---|---|---|---|
| 1,643,582 | 9/1927 | Martin | 324/106 X |
| 2,879,401 | 3/1959 | Chicurel | 250/83.3 |
| 3,161,045 | 12/1964 | Ames, Jr. | 330/69 X |
| 3,257,607 | 6/1966 | Pintell | 317/247 X |
| 3,453,432 | 7/1969 | McHenry | 317/247 X |
| 3,047,760 | 7/1962 | Hermsen et al. | 250/83.6 R |
| 3,056,059 | 9/1962 | Hermsen et al. | 250/83.6 R |
| 3,126,479 | 3/1964 | Mattson | 250/83.6 R |
| 3,185,848 | 5/1965 | Alexander | 250/83.6 R |
| 3,271,691 | 9/1966 | Hendon et al. | 250/83.6 R |
| 3,010,021 | 11/1961 | Roesch et al. | 250/83.6 |

Primary Examiner—Rudolph V. Rolinec
Assistant Examiner—Ernest F. Karlsen
Attorney—Darrell G. Brekke and G. T. McCoy

[57] ABSTRACT

A thermodielectric radiometer employing a polymer film or a capacitor dielectric. The film is charged to a suitable voltage gradient and, when it is heated by absorbed radiation, it produces a proportional open-circuit voltage increment which can be measured to provide an indication of the total energy or power of a short-duration pulse of radiant flux.

The invention described herein was made by employees of the United States Government and may be manufactured and used by or for the Government for governmental purposes without the payment of any royalties thereon or therefor.

8 Claims, 8 Drawing Figures

PATENTED APR 18 1972 3,657,644

INVENTORS
BENJAMIN H. BEAM
LARRY D. RUSSELL

By
ATTORNEYS

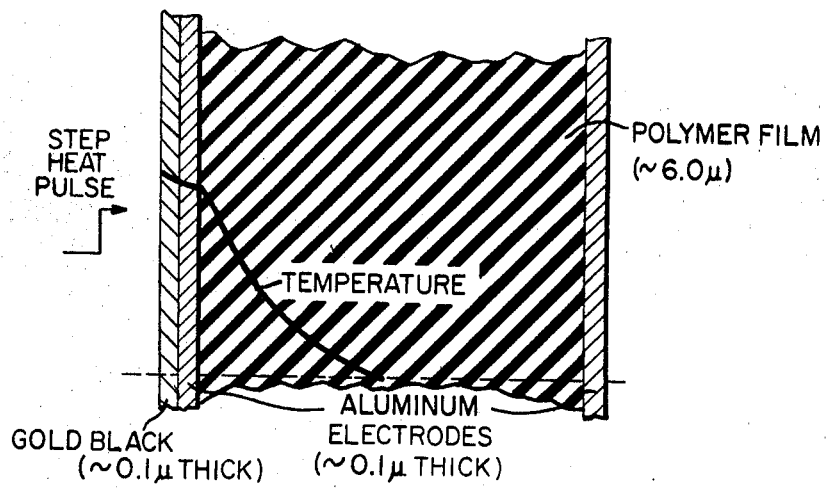
FIG. 4
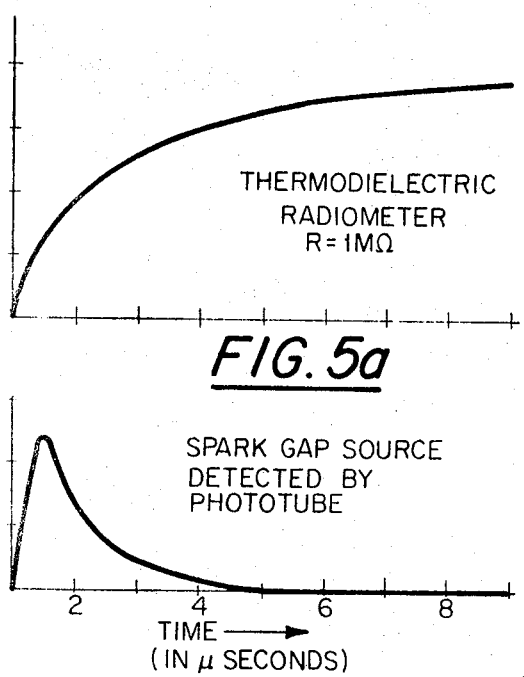
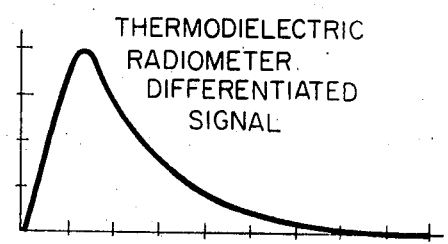
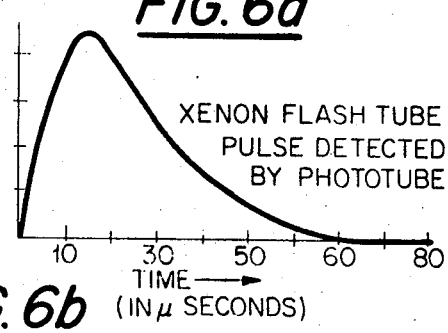
INVENTORS
BENJAMIN H. BEAM
LARRY D. RUSSELL
ATTORNEYS 3,657,644

THERMODIELECTRIC RADIOMETER UTILIZING POLYMER FILM

BACKGROUND OF THE INVENTION

1. Field of the Invention

This invention relates in general to radiant energy detectors, and relates more particularly to such detectors employing a polymer film dielectric.

2. Description of the Prior Art

Numerous devices have been proposed in the past for measuring radiant energy by means of variations in the properties of a capacitor which is exposed to the energy to be measured. Some of such devices, such as that shown in U.S. Pat. No. 3,307,407, rely on changes in the resistance of a capacitor in response to particle impact. Other devices, such as shown in U.S. Pats. Nos. 3,257,607 and 3,311,801, employ an organic dielectric material whose dielectric constant varies as a function of temperature, so that this variation in dielectric constant provides a measure of the thermal energy. While such devices, as well as others employing variations in capacitance as a function of temperature, have been satisfactory in many applications, they do not meet all the requirements of some applications, such as measuring total radiant energy emitted by a high-speed shock wave.

SUMMARY OF THE INVENTION

In accordance with the present invention, there is provided a thermodielectric radiometer employing a polymer film as a capacitor which is charged to a predetermined voltage. As the film is heated by absorbed radiation, some depolarization of the polymer dielectric occurs, thus increasing the open circuit voltage across the film. This voltage increase is proportional to the voltage to which the capacitor is initially charged and to the radiant energy absorbed by the capacitor. The voltage increase occurs as soon as the incident radiation penetrates a thin layer deposited on the polymer and begins to heat a portion of the dielectric, so that rapid response may be obtained from the device.

It is therefore an object of this invention to provide an improved thermodielectric radiometer employing a polymer dielectric film.

It is an additional object of the present invention to provide a thermodielectric radiometer employing a polymer dielectric film which undergoes thermal depolarization in response to incident radiation to produce an indication of the amount of incident radiation.

It is a further object of this invention to provide a thermodielectric radiometer employing a polymer dielectric film which forms the dielectric of a capacitor which is charged to a predetermined open circuit voltage and which varies this open circuit voltage in response to radiation incident upon the capacitor.

Objects and advantages other than those set forth above will be apparent from the following description when read in connection with the accompanying drawings.

BRIEF DESCRIPTION OF THE DRAWINGS

FIG. 4 is a diagram illustrating the temperature distribution through a polymer film utilized in accordance with this invention;

FIG. 5a is a graph illustrating the response of a thermodielectric radiometer in accordance with this invention to energy from a spark gap source whose output is shown in the graph of FIG. 5b; and FIG. 6a is a graph illustrating the differentiated output of a thermodielectric radiometer in accordance with this invention in response to a flash tube pulse whose output is shown in the graph of FIG. 6b.

DESCRIPTION OF THE PREFERRED EMBODIMENT

Figure 1:
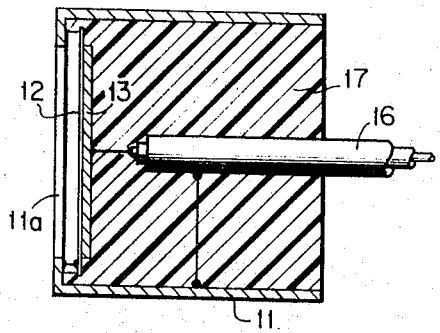
FIG. 1 shows the construction of a thermodielectric radiometer in accordance with this invention.

Referring to FIG. 1, a simple form of construction of a radiometer is shown and includes a metal case 11 in which the polymer film is placed. The polymer film 12 is formed into a capacitor by any suitable means such as by vacuum-depositing aluminum electrodes on both surfaces of the film. The capacitor is placed in case 11 with one exposed surface adjacent a window formed by an opening 11a in the case. The capacitor surface adjacent this window is preferably coated with a substance of high absorptivity such as gold which has been deposited by evaporation in about 1 Torr of inert gas. This produces a microporous, metallic coating which has an absorptance of 0.90 or better from the ultraviolet to about $15\mu$ in the infrared, thus giving the radiometer a wide spectral sensitivity.

Electrical contact to the film's electrodes is made to the metal case for the exposed front electrode and through a copper pellet 13 which is in contact with the rear electrode. Copper pellet 13 may be connected to the inner conductor of a coaxial cable 16 for supplying the developed signal to suitable detecting circuitry. The outer conductor of the coaxial cable is connected to case 11. The exposed front electrode is preferably at ground potential to provide electrostatic shielding. If the detector is to be used at low ambient pressures, where shorting due to ionization might occur, the film capacitor is preferably potted inside case 11 with a dielectric compound 17.

Any suitable polymer may be used for film 12, since thermal depolarization has been observed to a greater or lesser degree in a variety of such films. One particular polymer which has been found suitable is the polyester Mylar, manufactured by E. I. Dupont. A capacitor-grade film of this material having a thickness of $6\mu$ (one-fourth mil) was used, and the capacitor was formed by vacuum-depositing aluminum electrodes and coating the exposed electrode with gold black, as described above.

Figure 2:
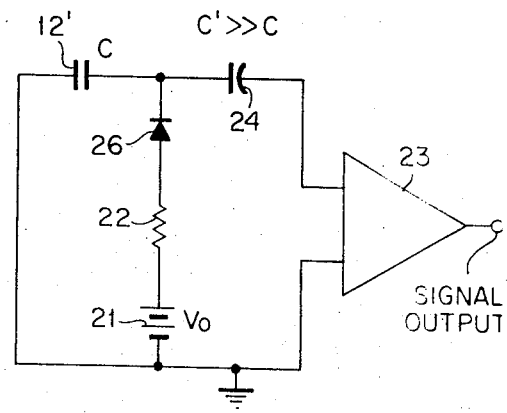
FIG. 2 is a schematic diagram of a circuit for utilizing the thermodielectric radiometer of FIG. 1.

FIG. 2 illustrates circuitry for operating the detector. Reference character 12' represents the capacitor formed by the polymer film and electrodes and has a capacitance designated as C. The capacitor is charged from a voltage source 21 through a current limiting resistor 22. The capacitor is preferably charged to a voltage gradient of about $100V/\mu$, depending upon the dielectric strength of the film. Since the signal voltage is directly proportional to the initial charge voltage, it is desirable to have as large a voltage gradient as possible.

A high input-impedance amplifier 23 is capacitively coupled through a capacitor 24 to the detector. When an absorbed radiant energy pulse impinging upon the exposed surface of the capacitor causes some thermal depolarization to occur and the voltage of the capacitor to rise, the voltage increment is detected and amplified by amplifier 23 and supplied to suitable recording or utilization equipment. A diode 26 may be placed in the circuit as shown to prevent any charge flow into the voltage source if the discharge time of capacitor 12' through resistor 22 and voltage source 21 approaches the discharge time of capacitor 12' through capacitor 24 and amplifier 23.

Prior to discussing further embodiments of the invention, the following theoretical considerations relative to thermal depolarization are presented as an aid in understanding the mechanism involved in the present invention. When the voltage of a charged, open-circuited capacitor increases as the temperature of the capacitor increases, it is evident that some depolarization releases bound charges which increase the open-circuit voltage of the capacitor. The thermal depolarization of a polymer film, which produces the signal in the thermodielectric radiometer of this invention, cannot be attributed to the temperature dependence of the dielectric constant of the polymer as commonly measured. The inventors have observed in a number of polymer films which have been charged to a constant DC voltage that the open-circuit voltage change due to a rapid temperature change is in the opposite direction to that expected from the thermal change of the dielectric constant that is commonly measured and reported. Also, the thermal variation of dielectric constant varies widely with different polymers, whereas the observed thermal depolarization voltage cannot be attributed to the estimated thermal expansion of the polymer because such an expansion induces voltages of opposite sign and of much smaller magnitude. The thermal depolarization voltage also has been observed to be independent of the temperature gradient across the film thickness.

Figure 3:
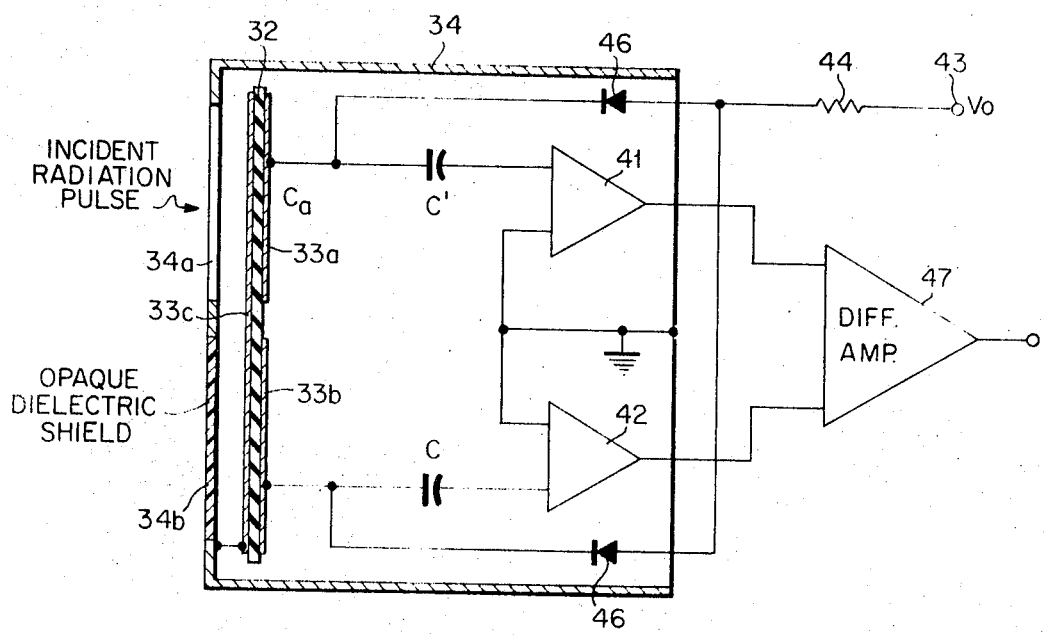
FIG. 3 is a schematic diagram of a circuit utilizing conjugate capacitors formed from a polymer film.

The present invention was primarily developed for measuring the total radiant power emitted by a high-speed shock wave, and for this application, the conjugate capacitor arrangement shown in FIG. 3 was developed to reduce the sensitivity of the detector to the high level of electromagnetic noise accompanying the shock wave. This embodiment includes two equal-valued capacitors $C_a$ and $C_b$ which utilize a common polymer film dielectric 32 and a common front electrode 33c which is at ground potential. The capacitor has two rear electrodes 33a, 33b which together with electrode 33c, form the capacitors $C_a$, $C_b$. Capacitor $C_a$ is exposed to the incident radiation and any prevalent noise through the window formed by an opening 34a in the case 34, while capacitor $C_b$ is shielded from the incident radiation by an opaque shield 34b and thus receives only the noise.

The signals from the two capacitors are amplified by respective preamplifiers 41, 42 which are preferably high input-impedance preamplifiers comprising a single field-effect transistor. These preamplifiers are preferably placed inside case 34 so as to be in close proximity with the capacitors. Each of the capacitors is charged to the same initial voltage from the voltage source 43 through a current limiting resistor 44 and diodes 46 may be used for the same reason given in the explanation of FIG. 2.

The outputs from preamplifiers 41, 42 are supplied to a differential amplifier 47, which may be a differential-input, oscilloscope amplifier. To the extent that the responses of the two capacitors to common mode noise are identical and the preamplifiers are balanced, common mode noise is rejected and only the radiant energy signal is received. By using this conjugate capacitor arrangement and placing high input-impedance amplifiers in close proximity to the capacitors, maximum symmetry, balance and consequent common mode noise rejection are achieved.

The response characteristic of the signal produced by the thermodielectric radiometer of this invention depends upon the thermal response of the polymer film and the electrical response of the detector's equivalent circuit and the external readout circuit. The thermal response is characterized by the fact that polymer thermal depolarization is a homogeneous or bulk process to the extent that the polymer itself is homogeneous. Local depolarization in the film can result from local heating. Thus, as soon as heat penetrates the electrode of the film capacitor and increases the temperature of the local front portion of the film, depolarization will occur in that region and produces a proportional increase in free charge. A schematic indication of the temperature distribution through a film due to a step heat pulse and before reaching equilibrium is shown in FIG. 4.

As soon as heat diffuses through the gold blackening and the front aluminum electrode, which takes on the order of nanoseconds, the polymer film receives thermal energy, and undergoes some depolarization. The signal is thus observed before the thermal pulse has had time to diffuse through the film to bring the film to an approximate equilibrium temperature. The heat diffusion time constants involved can be calculated from the equation for the temperature, as a function of time and distance, of an insulated slab with a prescribed flux at its surface. Calculations show that the ultimate thermal time response of the detector is limited by the heat diffusion time constant of the electrode and blackening, and is in the order of nanoseconds.

If the voltage signal $\Delta V$ of the radiometer is detected by a capacitance-coupled, high-impedance amplifier, the response is similar to that shown by the graph of FIG. 5a for the pulse of a spark gap source having an output represented by the graph of FIG. 5b. The signal $\Delta V$ is proportional to the absorbed energy, which is the time-integral of the incident power, and is stored for a time determined by the discharge rate of the equivalent circuit.

A response directly proportional to the incident power can be obtained by detecting the voltage signal with a differentiating operational amplifier. This response is illustrated by the graph of FIG. 6a showing the differentiated signal from the radiometer in response to a flash tube pulse shown in the graph of FIG. 6b.

The thermodielectric radiometers described above were developed primarily for the particular application of measuring the total radiation emitted by a high-speed shock wave created in an arc-driven shock tube. The principal requirements for such a detector were a flat spectral response from the mid-infrared to the vacuum ultraviolet range, a sufficiently fast rise time response to adequately record and resolve the 5 to 10 microsecond duration shock-wave emittance, and immunity to signal noise caused primarily by the charge gradients and the high energy ultraviolet radiation of the shock wave. The shock wave can reach a velocity of up to 12 km/sec and a temperature of up to 15,000°K. For this application, the radiometer was mounted inside a cavity and exposed to the shock-wave radiation through a small aperture. This cavity arrangement delayed the shock pressure wave so that it would not interfere with the desired radiation signal.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. Apparatus for real time detection of pulses of radiant energy in the infrared to ultraviolet range comprising:
   a capacitor having a polymer film dielectric coated with electrodes thinner than said film;
   means connected in parallel with said capacitor for continuously charging said capacitor to a predetermined open circuit d-c voltage;
   means for exposing said polymer film dielectric to said radiant energy to be detected to produce thermal depolarization in said polymer film dielectric, said thermal depolarization increasing the free charge of said capacitor and generating an open-circuit voltage increment directly proportional to said predetermined voltage and the absorbed radiant energy; and
   detection means connected in parallel with said capacitor to detect said open-circuit voltage increment to provide a measure of said radiant energy.

2. Apparatus in accordance with claim 1 wherein the opposite surfaces of said dielectric film each have at least one electrode placed thereon; and
   said charging means comprises a diode, a resistance, and a d-c voltage source connected in series.

3. Apparatus in accordance with claim 2 including a housing for said capacitor, said housing having an opening therein, said capacitor, being positioned adjacent said opening to receive radiant energy entering said opening.

4. Apparatus in accordance with claim 2 including a substance of high absorptivity deposited on one of said electrodes to increase the radiation absorption of said capacitor.

5. Apparatus for detecting radiant energy in the presence of electromagnetic noise comprising:
   a capacitor having a polymer film dielectric;
   means coupled to said capacitor for continuously charging said capacitor to a predetermined open-circuit d-c voltage;

means for exposing said polymer film dielectric to the radiant energy to be detected to produce thermal depolarization in said polymer film dielectric, said thermal depolarization generating an open-circuit voltage increment proportional to said predetermined voltage and said radiant energy;

detection means connected to said capacitor to detect said open-circuit voltage increment to provide a measure of said radiant energy;

said capacitor comprising first and second electrodes disposed on one surface of said dielectric film and a third electrode coextensive with said first and second electrodes disposed on the opposite surface of said dielectric film, said first electrode, said third electrode, and said polymer film dielectric therebetween forming a capacitor section, said second electrode, said third electrode, and said polymer film dielectric therebetween forming another capacitor section;

said exposing means exposing one of said capacitor sections to both said radiant energy and said electromagnetic noise and exposing said other capacitor section to only said electromagnetic noise; and said detection means including differential amplifying means connected to said capacitors for differentially amplifying the increases in open-circuit voltage thereacross as a result of thermal depolarization of said film dielectric, to thereby reduce the effect of said noise.

6. Apparatus in accordance with claim 5 including a housing, said housing having a first window therein which is transparent to both said radiant energy and said noise, and having a second window therein which is transparent only to said noise, said one capacitor section being positioned adjacent said first window and said other capacitor section being positioned adjacent said second window.

7. Apparatus in accordance with claim 6 including preamplifier means disposed in said housing and connected between said capacitor sections and said differential amplifying means.

8. Apparatus in accordance with claim 5 including a substance of high absorptivity on said third electrode to increase the radiation absorption of said capacitor sections.

* * * * *